United States Patent [19]

Grover et al.

[11] Patent Number: 4,487,330
[45] Date of Patent: Dec. 11, 1984

[54] TRIM CLAMP ASSEMBLY

[75] Inventors: Dennis J. Grover, Kokomo, Ind.; David W. West, Naperville, Ill.

[73] Assignee: Square D Company, Palatine, Ill.

[21] Appl. No.: 568,552

[22] Filed: Jan. 5, 1984

[51] Int. Cl.³ ............................................. B65D 45/16
[52] U.S. Cl. ..................................... 220/324; 220/3.8; 361/356; 361/360
[58] Field of Search ....................... 220/324, 3.8, 342; 361/356, 360; 174/66, 67

[56] References Cited

U.S. PATENT DOCUMENTS 3,339,124  8/1967  Jorgensen ............................ 361/356
3,946,283  3/1976  Meacham et al. .................. 361/360
4,131,932  12/1978  Brumfield et al. ................. 361/356

Primary Examiner—George T. Hall
Attorney, Agent, or Firm—Larry I. Golden; Richard T. Guttman

[57] ABSTRACT

A compact and economical clamp assembly for securing a cover plate to an open front electrical panelboard box having mounting flanges. The assembly includes an insulating sleeve surrounding a screw, both of which extend through a hole in the cover plate. The screw has a slotted head, a reduced diameter tip and an intermediate threaded portion. The sleeve has a recess to receive the screw head and a pair of diametrically opposed slots extending from a mid portion of the sleeve to one end. The screw is positioned so that the slots of the sleeve overlap a substantial portion of the threaded portion of the screw. A nut, threadingly engaged with the screw, has two wings which protrude through the respective slots of the sleeve. A clamp member, having a camming end and a clamping end, is pivotally connected to the wings. A torsional spring biases the camming end of the clamp member into contact with the cover. As the screw is turned in a predetermined direction, the nut advances toward the cover, drawing the clamping end to the cover to secure the cover plate against the mounting flange of the box.

15 Claims, 5 Drawing Figures

TRIM CLAMP ASSEMBLY

BACKGROUND OF THE INVENTION

1. Field of the Invention

This invention relates generally to clamping members and more particularly to a clamp assembly for securing a front trim panel to an open front electrical panelboard box.

2. Description of the Prior Art

Panelboards have various types of clamps for clamping exterior trim and door assemblies in position with respect to the open front boxes of electrical panelboards and telephone cabinets.

Exemplary of such a clamp assembly is that disclosed by U.S. Pat. No. 4,131,932, issued Dec. 26, 1978 to Brumfield, Jr. et al. Preferably, the clamp members are adjustably tightened against the back of the side flanges of the box to draw the cover snuggly against either an adjacent wall or against the front side of the side flanges to eliminate the need for adjustment of the interior trim assembly. Furthermore, the clamp assemblies must be adjustable to a position which will enable ready positioning of the cover against the box. The relatively large clamp assemblies disclosed in Brumfield, Jr. et al rotate about an axis perpendicular to the cover to enable the cover to be positioned against the box and are then rotated back to their original position to enable tightening of the clamp members against the flange of the box.

There is a need for a simpler, more compact, economical clamp assembly especially for use in some of the more narrow panelboards which have less space between the door opening on the cover and the side of the box with which the cover is engaged.

SUMMARY OF THE INVENTION

The present invention provides a simple, compact and economical clamp assembly for use in securing a cover plate to a box having front mounting flanges over which the cover is positioned.

The clamp assembly includes a cylindrical sleeve member which extends through an opening in the cover plate. The sleeve has a head at one end and a pair of diametrically opposed slots extending away from the head from a point adjacent the head throughout the length of the sleeve. A screw having a slotted head at one end, an intermediate threaded portion and a reduced diameter tip at its opposite end is positioned along the longitudinal axis of the sleeve with the screw head received in a recessed portion provided in the head of the sleeve. A double winged nut having its wings extending respectively through each of the slots in the sleeve is threadingly engaged with the screw and a rockable clamp arm is pivotally connected to the wings of the nut. The clamp arm is spring biased to an open position and, upon tightening the screw, the nut is drawn toward the cover plate and the clamp arm is drawn to a closed position.

It is an object of this invention to provide a readily assembled, compact clamp assembly for use in securing a cover plate to a cabinet.

It is a further object of the instant invention to provide a reliable clamp assembly which is simplistic in operation and requires no more than the turning of a screw to move the assembly from a fully clamped position to an open position permitting removal or installation of the cover plate.

Further objects and advantages will become apparent from the following description and claims taken together with the drawings.

DESCRIPTION OF THE PREFERRED EMBODIMENT

Figure 1:
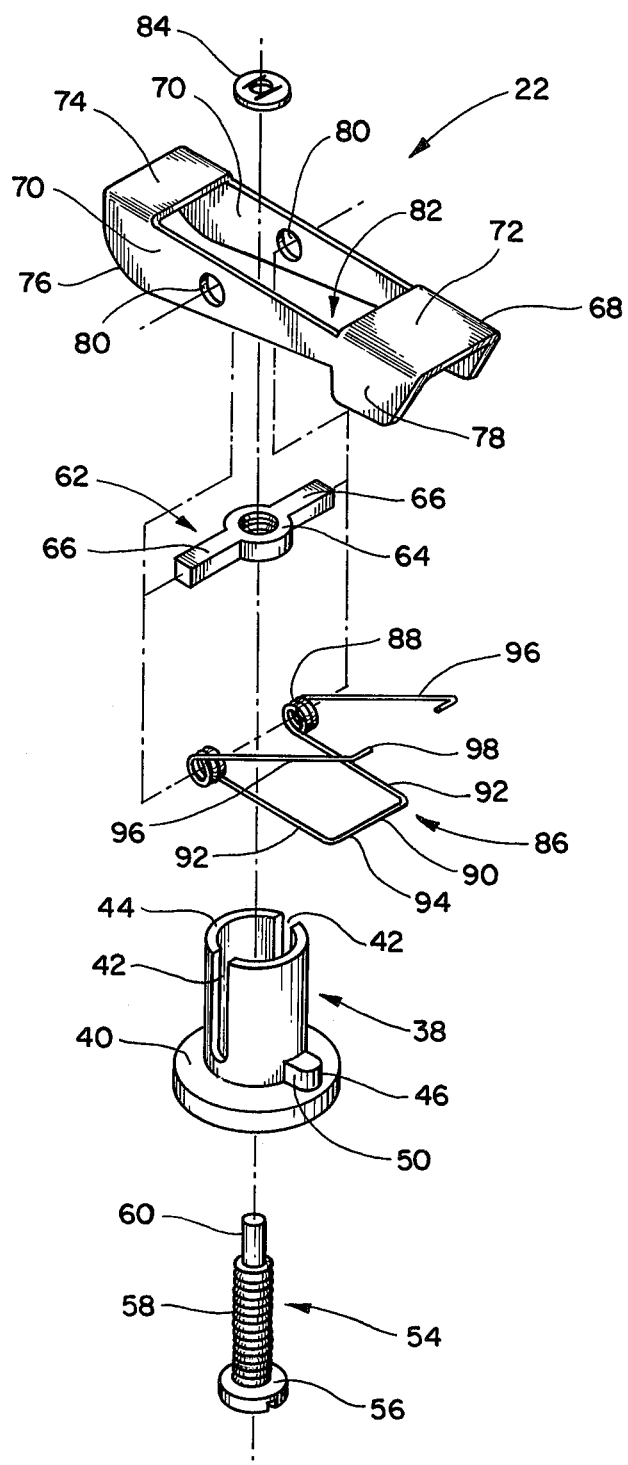
FIG. 1 is an exploded perspective view of the clamp assembly incorporating the principals of the present invention.
Figure 2:
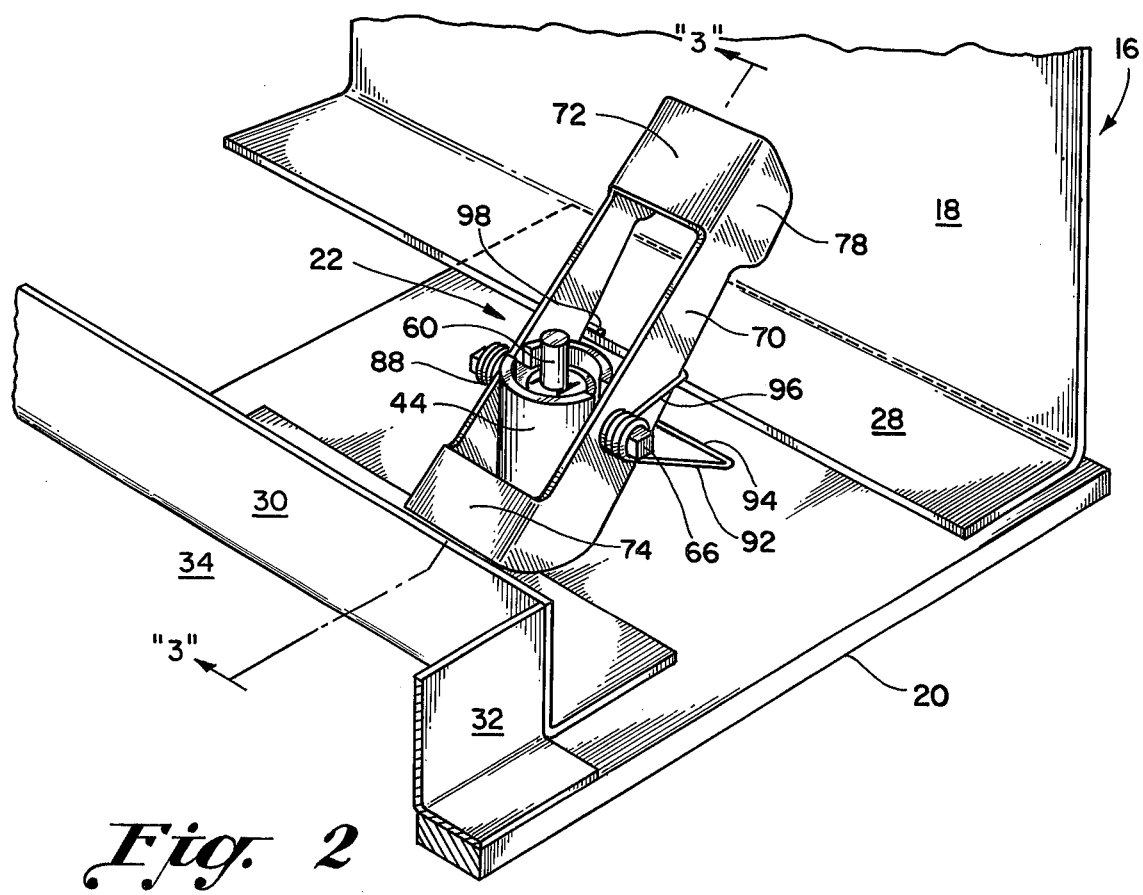
FIG. 2 is a perspective view of the clamp assembly in its open position.
Figure 4:
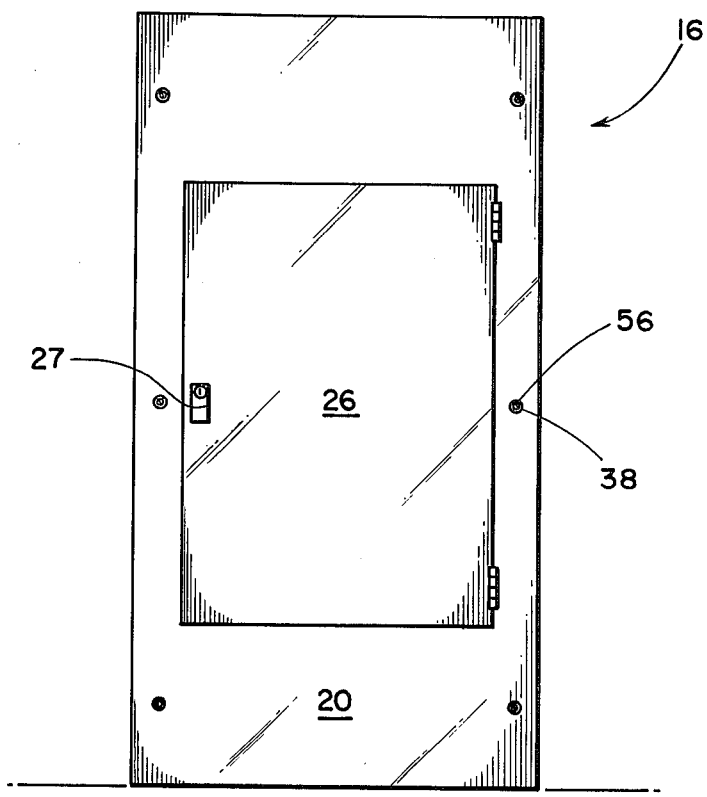
FIG. 4 is a front view of a panelboard including a cover incorporating the inventive clamp assembly.
Figure 5:
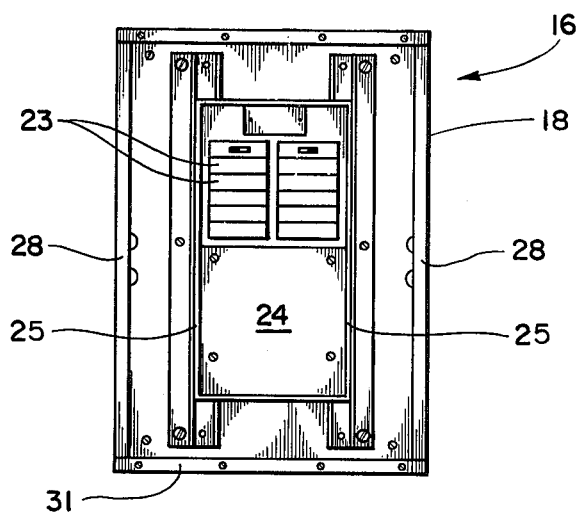
FIG. 5 is a front view of a panelboard without the cover with which the cover and clamp assembly are associated.

Referring to FIGS. 2, 4 and 5 of the Drawings, a panelboard assembly is indicated by reference character 16. The panelboard assembly 16 includes a cabinet or box 18 having a cover 20 overlapping the cabinet and retained thereto through the use of several clamp assemblies 22. As shown in FIG. 5, the box 18 carries an interior assembly including interior trim 24 as referred to in U.S. Pat. No. 4,162,517 issued July 24, 1979 to Reed. The interior trim 24 is behind a door 26 that is hinged to cover 20, as shown in FIG. 4, to provide access to circuit breakers 23 which may be connected to the interior assembly without requiring removal of the cover 20. A lock 27 is provided on door 26 to facilitate operations and locking of the door with respect to cover 20.

The cover 20 is secured to box 18 by means of a plurality of spaced clamp assemblies 22 which capture a respective side or lip 28 of the box between the clamp and the cover. The clamp assemblies are spaced along the longitudinal side margins of cover plate 20 in order to securely fasten the cover to the box 18.

A pair of side rabbets 30 and top and bottom rabbets 32 frame the door opening 34 on the cover 20. The rabbets are generally L-shaped lengths of metal having one side welded or otherwise connected to the inside surface of cover 20. The rabbets are associated with outwardly projecting flange walls or rabbets 25 on the interior trim 24 as described for example in the Reed patent to resist an attempt to insert a metal object behind the interior trim 24. Many different arrangements are feasible for this purpose including association of single or double rabbets on the cover with cooperative rabbets or flanges on the interior trim. The rabbets on the cover, however, restrict the available space for operation of clamp assemblies which secure the cover to the box. This is particularly true in a relatively narrow panelboard that may have less than 3.25 inches between the side rabbet 20 and the sidewall of box 18. Accordingly the clamp assembly must be compact.

Holes 36 are provided in the cover to facilitate mounting of the clamp assemblies. Inserted through the hole is an insulating sleeve member 38 having a head 40 at one end and a pair of diametrically opposed slots 42 extending from the opposite end of the sleeve toward the head whereby a pair of opposite crescent portions 44 are provided on the sleeve that are passed through the hole 36. A nib 46 is provided at the underside of the head adjacent one of the crescent portions. Nib 46 is received in a notch 48 which is provided in communication with hole 36 on the cover. Lateral surface portions 50 of nib 46 abut against portions of the cover which define the notch to restrain the sleeve member from rotational movement within hole 36. The head 40 of the sleeve 38 is provided with a recess 52 which receives the head of a screw member 54. The screw includes a slotted head 56 at one end, a threaded intermediate portion 58 and a tip 60 at an opposite end having a reduced diameter from the intermediate portion. A winged swivel nut 62 includes a threaded central portion 64 and opposite wings 66. The screw 54 is inserted into the sleeve member such that the head 56 is received in recess 52 with tip 60 extending along the longitudinal axis of the sleeve member past crescent portions 44. The screw is threaded through the swivel nut 62 with the wings 66 extending radially outward from sleeve 38 through slots 42.

A generally U-shaped clamp arm 68 includes a pair of opposite side legs 70 joined at a front or clamping end by clamping bridge 72 and joined at its opposite or camming end by cam bridge 74. The legs of the clamp arm are dimensioned to provide a rounded camming surface 76 at the camming end which tapers upward towards the clamping end. A projecting lobe portion 78 is provided which extends downward from bridge 72 to clamp the lip 28 of box 18 between the clamp arm and the cover 20.

An opening 80 is provided in each of the leg portions 70 on the camming side of the leg portion. The openings 80 are aligned to receive the opposite wings 66 of nut 62. A cutaway portion 82 is provided on the clamp arm between bridging portions 72 and 74. This space accommodates receipt of the sleeve member and extending tip 60 of screw 54 when the clamp arm is moved to a fully closed position. A push-on fastener 84 is pushed over tip 60 to retain the swivel nut on screw 54.

The clamp arm is biased by spring member 86 to a clamp open position. Spring member 86 includes opposite coil portions 88 which are connected by a generally U-shaped bridging portion 90 having legs 92 and a connecting portion 94. The opposite ends of each of the coils include an arm 96 with an inwardly bent tang 98 at the distal end of each arm.

The wings 68 of nut 62 extend respectively through the coil portions 88 of the spring member which are located on the outside portion of leg members 70. The inwardly bent tangs 98 are bent around the underside of respective leg portions 70 adjacent the lobe portions 78. Connecting portion 94 of the spring abuts against cover 20 and arms 96 bias clamp arm 68 toward an open position as shown in FIG. 2.

Figure 3:
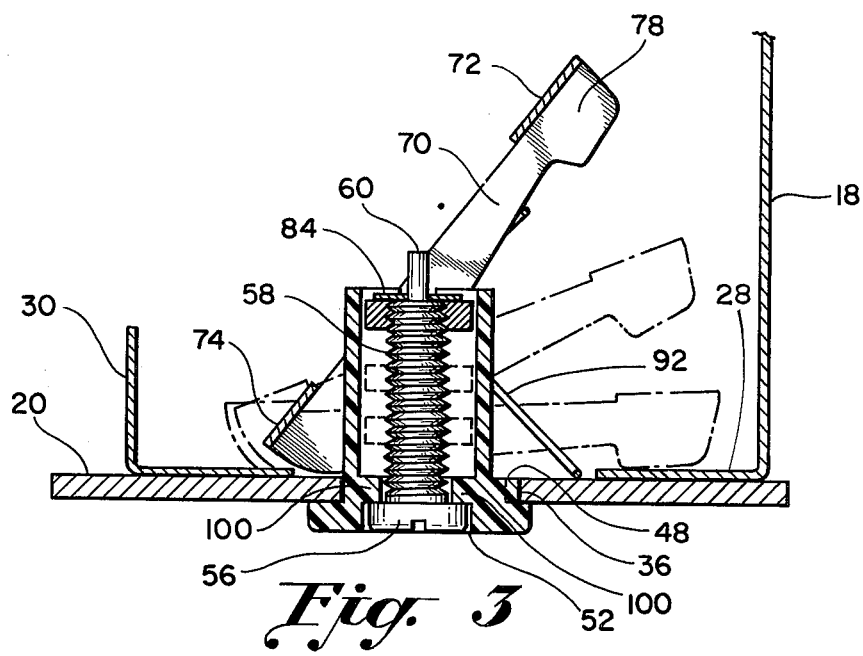
FIG. 3 is a cross-sectional view taken along lines 3—3 in FIG. 2 showing the clamp in its open position and also showing, in phantom, the clamp moving towards a closed position.

As shown in FIG. 3, as screw 54 is turned in a tightening direction, or in this instance to the right, the nut 62 is drawn toward the cover plate. The screw head cannot pass through stop portions 100 of sleeve 38 and because wings 66 extend through slots 42, the nut cannot rotate with respect to the sleeve member. Accordingly, the slots permit the nut to be threadingly drawn along the intermediate portion of the screw toward the screw head in response to the tightening rotation of the screw.

As the nut is drawn toward the cover plate, clamp arm 68 is also drawn toward the cover plate since it is pivotally connected to the wings of the nut. As the intermediate portion of the clamp arm is drawn perpendicularly toward cover plate 20, the cam surface 76, which is biased against the plate, slides a short distance away from the sleeve as the clamp arm is moved from an open position to a closed position. The cam surface 76 is accordingly contoured to permit sliding motion of the clamp arm as the arm is drawn against the spring bias to a closed position.

While the invention has particularly been shown and described with reference to a preferred embodiment, it will be understood by those skilled in the art that variations in form, construction and arrangements may be made therein without departing from the spirit and scope of the invention, all such variations are intended to be covered in the appended claims.

We claim:

1. An adjustable clamp assembly on a cover plate for clamping the cover plate to a box having a mounting flange comprising:
   a sleeve having a longitudinal axis extending outward from said cover plate, said sleeve including a plurality of slots directed in generally perpendicular relationship to said cover plate;
   a screw positioned along said longitudinal axis of said sleeve;
   a nut threadingly engaged with said screw, said nut including a plurality of wings extending radially outward from said longitudinal axis, each wing extending through a respective one of said slots whereby rotation of said nut with respect to said sleeve is prevented;
   a clamp member pivotally associated with said nut and including a first end portion and an opposite second end portion;
   biasing means for biasing said clamp member to a first position wherein said first end portion is engaged with said cover plate and said second end portion is spaced substantially away from said cover plate, said second end portion being drawn against the bias of said biasing means toward said cover plate in response to the turning of said screw which draws the nut toward the cover plate.

2. A clamp assembly as claimed in claim 1 wherein said sleeve comprises a nonintegral part of said cover plate and includes a head at one end and a pair of diametrically opposed slots beginning adjacent said head and extending away from said head throughout the entire length of the sleeve.

3. A clamp assembly as claimed in claim 2 wherein said sleeve includes a nib provided on the underside of said head and said cover plate includes portions defining a notch which receives said nib and restrains rotation of said sleeve with respect to said cover plate.

4. A clamp assembly as claimed in claim 2 wherein said screw includes a slotted screw head at one end, an intermediate threaded portion and a reduced diameter tip at the opposite end.

5. A clamp assembly as claimed in claim 4 wherein said head on said sleeve includes portions defining a recess which receives said slotted head of said screw, said clamp assembly further including a fastener secured to the tip of said screw to retain said nut on the screw.

6. A clamp assembly as claimed in claim 1 wherein said clamp member comprises a pair of legs joined at a first side of and also joined at a second side of each leg including an opening in registration with one another, said nut including a pair of diametrically opposed wings, each of said wings extending through a respective one of said openings.

7. A clamp assembly as claimed in claim 6 wherein said biasing means comprises a tortional spring member.

8. A clamp assembly as claimed in claim 7 wherein said tortional spring comprises a pair of coil portions each respectively surrounding a wing, a generally U-shaped bridging portion having a pair of opposite legs and a connecting portion, said connecting portion abutting against said cover, and an arm extending from the opposite end of each coil, said arm including a bent tang portion engaged with the underside of said clamp member.

9. A clamp assembly as claimed in claim 8 wherein said sleeve is formed from an insulating material.

10. A clamp assembly as claimed in claim 8 wherein said clamp member legs each comprising a rounded camming surface at the first end portion which tapers upward towards the second end portion.

11. A clamp assembly as claimed in claim 10 wherein said clamp member includes a cut-away portion between said legs and between said first end portion and said second end portion, dimensioned to accommodate the sleeve.

12. A clamp assembly as claimed in claim 11 wherein said clamp member is generally U-shaped in cross section.

13. An adjustable clamp assembly for clamping a cover plate having a first surface, a second surface, and an opening therethrough, to an open front box having a mounting flange, said clamp assembly comprising:

a sleeve having a longitudinal axis generally perpendicular to said cover plate, said sleeve having a portion extending through said opening and generally outwardly from said first surface and including a plurality of slots in said extending portion having a component in the longitudinal axial direction;

a screw having a head and a middle threaded portion, said screw extending from the head which is located in engaging relationship with the second surface through the cover plate to the threaded portion located generally within said sleeve extending portion, said screw being approximately positioned along said longitudinal axis of said sleeve;

a nut threadingly engaged with the threaded portion of said screw, said nut including a plurality of wings extending radially outward from said longitudinal axis, each wing extending through a respective one of said slots whereby rotation of said nut with respect to said sleeve is prevented;

a clamp member pivotally associated with said nut and including a first end portion and an opposite second end portion; and biasing means for biasing said clamp member to a first position wherein said first end portion is engaged with said cover plate and said second end portion is spaced substantially away from said cover plate, said second end portion being drawn against the bias of said biasing means toward said cover plate in response to the turning of said screw which draws the nut toward the cover plate.

14. A clamp assembly as claimed in claim 13 wherein said clamp member comprises two legs, each with first and second ends and an opening, said legs located tangential to said slots and joined at their respective first ends by the first end portion and at their respective second ends by the second end portion, said sleeve including a pair of slots, and said nut including a pair of diametrically opposed wings, each wing extending through a slot and through a respective opening in said legs.

15. A clamp assembly as claimed in claim 14 wherein said sleeve includes a stop surface portion within said sleeve approximately perpendicular to said longitudinal sleeve axis adapted to prevent the screw head from passing into the sleeve extended portion.

* * * * *